(12) United States Patent
Fukami et al.

(10) Patent No.: US 11,319,923 B2
(45) Date of Patent: May 3, 2022

(54) VORTEX GENERATOR FOR WIND TURBINE BLADE, WIND TURBINE BLADE, WIND TURBINE POWER GENERATING APPARATUS, AND METHOD OF MOUNTING VORTEX GENERATOR

(71) Applicant: MITSUBISHI HEAVY INDUSTRIES, LTD., Tokyo (JP)

(72) Inventors: Koji Fukami, Tokyo (JP); Daisuke Wakata, Tokyo (JP); Yuji Yatomi, Tokyo (JP); Takashi Yamamura, Yokohama (JP); Yoshihiro Fujioka, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 527 days.

(21) Appl. No.: 15/259,811

(22) Filed: Sep. 8, 2016

(65) Prior Publication Data
US 2017/0248116 A1    Aug. 31, 2017

(30) Foreign Application Priority Data

Feb. 26, 2016   (JP) .............................. JP2016-035879

(51) Int. Cl.
*F03D 1/06* (2006.01)
*F03D 13/10* (2016.01)

(52) U.S. Cl.
CPC ......... *F03D 1/0675* (2013.01); *F03D 1/0633* (2013.01); *F03D 13/10* (2016.05);
(Continued)

(58) Field of Classification Search
CPC ...... F03D 1/0675; F03D 1/001; F03D 1/0641; F03D 1/0633; F03D 13/10;
(Continued)

(56) References Cited

U.S. PATENT DOCUMENTS 2,690,315 A * 9/1954 Todoroff ................. B64C 23/06
219/202
4,175,640 A * 11/1979 Birch ...................... F02K 1/386
181/213
(Continued)

FOREIGN PATENT DOCUMENTS

AU     2006344292 A1   12/2007
DE    102013201871 A1   8/2014
(Continued)

OTHER PUBLICATIONS

Europe Patent Office, "Search Report for European Patent Application No. 16189464.7," dated Jul. 4, 2017.
(Continued)

*Primary Examiner* — Kenneth Bomberg
*Assistant Examiner* — Julian B Getachew
(74) *Attorney, Agent, or Firm* — Manabu Kanesaka; Benjamin Hauptman; Kenneth Berner

(57) ABSTRACT

A vortex generator for a wind turbine blade includes: a platform portion to be fixed to a surface of the wind turbine blade; and at least one fin erected on the platform portion. The platform portion includes marks disposed on a pair of opposite positions in an outer edge region of the platform portion and indicating orientation of the vortex generator.

13 Claims, 10 Drawing Sheets

(52) U.S. Cl.
CPC ... *F05B 2230/604* (2013.01); *F05B 2240/122* (2013.01); *F05B 2250/141* (2013.01); *Y02E 10/72* (2013.01); *Y02P 70/50* (2015.11)

(58) Field of Classification Search
CPC ............ F05B 2230/604; F05B 2240/30; F05D 2240/122; F05D 2240/127; B64C 23/06
See application file for complete search history.

(56) References Cited

U.S. PATENT DOCUMENTS

| | | | |
|---|---|---|---|
| 5,117,560 A * | 6/1992 | Nevins | B43L 7/10 |
| | | | 33/424 |
| 5,474,425 A | 12/1995 | Lawlor | |
| 6,427,948 B1 * | 8/2002 | Campbell | B64C 23/06 |
| | | | 244/130 |
| 8,678,746 B2 | 3/2014 | Haag | |
| 9,051,919 B2 | 6/2015 | Jensen et al. | |
| 9,133,816 B2 | 9/2015 | Jensen et al. | |
| 9,273,667 B2 | 3/2016 | Enevoldsen et al. | |
| 9,494,132 B2 | 11/2016 | Riddell et al. | |
| 9,562,513 B2 * | 2/2017 | Tobin | F03D 1/0633 |
| 9,759,186 B2 | 9/2017 | Grabau et al. | |
| 2010/0170339 A1 | 7/2010 | Lenz | |
| 2010/0209258 A1 * | 8/2010 | Fuglsang | F03D 1/0641 |
| | | | 416/90 R |
| 2011/0142673 A1 | 6/2011 | Fang et al. | |
| 2012/0151769 A1 | 6/2012 | Brake et al. | |
| 2012/0257977 A1 | 10/2012 | Jensen et al. | |
| 2012/0257979 A1 | 10/2012 | Jensen et al. | |
| 2013/0129520 A1 | 5/2013 | Envoldsen et al. | |
| 2014/0140856 A1 * | 5/2014 | Madsen | F03D 1/0641 |
| | | | 416/236 R |
| 2014/0241880 A1 | 8/2014 | Madsen | |
| 2014/0328692 A1 * | 11/2014 | Riddell | F03D 1/0675 |
| | | | 416/236 R |
| 2014/0328693 A1 | 11/2014 | Wilson et al. | |
| 2015/0010407 A1 | 1/2015 | Zamora Rodriguez et al. | |
| 2015/0132135 A1 | 5/2015 | Booth et al. | |
| 2016/0017864 A1 | 1/2016 | Grabau et al. | |
| 2016/0215758 A1 | 7/2016 | Corten | |
| 2016/0252073 A1 | 9/2016 | Fuglsang et al. | |

FOREIGN PATENT DOCUMENTS

| | | | | |
|---|---|---|---|---|
| EP | 2031241 | A1 | 3/2009 | |
| EP | 2484895 | A1 | 8/2012 | |
| EP | 2484896 | A1 | 8/2012 | |
| EP | 2484897 | A1 | 8/2012 | |
| EP | 2484898 | A1 | 8/2012 | |
| EP | 2548800 | A1 | 1/2013 | |
| EP | 2548801 | A1 | 1/2013 | |
| EP | 2597300 | A1 | 5/2013 | |
| EP | 2799709 | A1 | 11/2014 | |
| EP | 2799710 | A1 | 11/2014 | |
| EP | 2801720 | A1 | 11/2014 | |
| EP | 2975259 | A1 | 1/2016 | |
| NL | WO 2015030573 | A1 * | 3/2015 | ............ B64C 23/06 |
| WO | 00/15961 | A1 | 3/2000 | |
| WO | 2007/140771 | A1 | 12/2007 | |
| WO | 2013/014082 | A2 | 1/2013 | |
| WO | 2015/030573 | A1 | 3/2015 | |
| WO | 2015/053768 | A1 | 4/2015 | |

OTHER PUBLICATIONS

Japan Patent Office, "Office Action for Japanese Patent Application No. 2016-035880," dated Feb. 7, 2017.
Europe Patent Office, "Search Report for European Patent Application No. 16189461.3," dated Jun. 30, 2017.
Japan Patent Office, "A partial refusal notification to the relevant Design Application No. 2016-500691 which was derived from an International Design Registration No. DM/090957," dated Oct. 7, 2016.
Japan Patent Office, "A partial refusal notification to the relevant Design Application No. 2016-500692 which was derived from an International Design Registration No. DM/090957," dated Oct. 7, 2016.
U.S.P.T.O, "Office Action for U.S. Appl. No. 15/335,644," dated Apr. 4, 2019.
Europe Patent Office, "Office Action for European Application No. 16189461.3," dated Feb. 15, 2019.
U.S.P.T.O, "Office Action for U.S. Appl. No. 15/335,644," dated Aug. 20, 2019.
RVProject, YouTube, https://www.youtube.com/watch?v=sxz85_uyWUc, Published Jul. 5, 2015 (Year: 2015).
Adventures on the Fly!, YouTube, https://www.youtube.com/watch?v=JV80QAzSmR4, Published Feb. 27, 2014 (Year: 2014).
U.S.P.T.O, "Office Action for U.S. Appl. No. 15/335,644," dated Nov. 21, 2018.
Europe Patent Office, "Search Report for European Patent Application No. 16189461.3," dated May 24, 2018.
Europe Patent Office, "Search Report for European Patent Application No. 17200830.2," dated Mar. 15, 2018.

* cited by examiner

VORTEX GENERATOR FOR WIND TURBINE BLADE, WIND TURBINE BLADE, WIND TURBINE POWER GENERATING APPARATUS, AND METHOD OF MOUNTING VORTEX GENERATOR

RELATED APPLICATIONS

The present application is based on, and claims priority from, Japanese Application No. JP2016-035879 filed Feb. 26, 2016, the disclosure of which is hereby incorporated by reference herein in its entirety.

TECHNICAL FIELD

The present disclosure relates to a vortex generator for a wind turbine blade, a wind turbine blade, a wind turbine power generating apparatus, and a method of mounting a vortex generator.

BACKGROUND ART

Approaches to improve aerodynamic performance of a wind turbine blade have been sought for some time in context of improvement of operation efficiency of a wind turbine. In one of the approaches, a vortex generator is disposed on a surface of a wind turbine blade to suppress separation of a flow along the surface of the wind turbine blade.

Patent Documents 1 to 10 disclose a vortex generator having a platform portion to be mounted to a surface of a wind turbine blade, and a fin disposed upright on the platform portion.

CITATION LIST

Patent Literature

Patent Document 1: US Patent Application Publication No. 2014/0140856
Patent Document 2: EP2548800A
Patent Document 3: EP2799709A
Patent Document 4: WO2007/140771A
Patent Document 5: EP2484895A
Patent Document 6: EP2484896A
Patent Document 7: EP2484897A
Patent Document 8: EP2484898A
Patent Document 9: WO2015/030573A
Patent Document 10: EP2597300A

SUMMARY

If a mounting direction of a vortex generator with respect to an inflow direction of wind is not a suitable direction, generation of vortices by the vortex generator may become unstable, which may lead to insufficient improvement of the aerodynamic performance of a wind turbine blade, or even to a decrease in the aerodynamic performance of a wind turbine blade. Thus, it is desirable to mount a vortex generator to a wind turbine blade so that the vortex generator forms a predetermined mounting angle with the wind turbine blade.

However, Patent Documents 1 to 10 do not disclose any specific configuration of a vortex generator for mounting a vortex generator to a wind turbine blade accurately at a predetermined mounting angle.

In view of the above, an object of at least one embodiment of the present invention is to provide a vortex generator which is mountable to a wind turbine blade in a suitable mounting direction with respect to an inflow direction of wind.

(1) A vortex generator for a wind turbine blade according to at least one embodiment of the present invention comprises: a platform portion to be fixed to a surface of the wind turbine blade; and at least one fin erected on the platform portion. The platform portion includes marks disposed on a pair of opposite positions in an outer edge region of the platform portion and indicating orientation of the vortex generator.

With the above configuration (1), the vortex generator has marks disposed on at least a pair of opposite positions in an outer edge region of the platform portion, the marks indicating orientation of the vortex generator. Thus, by adjusting a mounting angle of the vortex generator so that the marks of the vortex generator form a predetermined angle with a reference direction on the wind turbine blade, it is possible to mount the vortex generator to the wind turbine blade in a suitable mounting direction with respect to an inflow direction of wind.

(2) In some embodiments, in the above configuration (1), the platform portion has a circular shape in a top view, and a line connecting the pair of opposite positions passes through a center of the circular shape of the platform portion.

With the above configuration (2), the platform portion of the vortex generator has a circular shape in a top view, and a line that connects a pair of opposite positions of the marks passes through the center of the platform portion, and thereby it is possible to specify the center position of the circular shape of the platform portion in a direction orthogonal to the line on a blade surface of the wind turbine blade. Thus, it is possible to position the vortex generator at the mounting position on the wind turbine blade by making use of the marks on the platform portion.

(3) In some embodiments, in the above configuration (2), the at least one fin comprises two fins disposed adjacent to each other on the platform portion and oriented so that chordwise directions of the two fins intersect with each other. The marks comprise: a first reference mark disposed on a line which connects the pair of opposite positions and passes through the center of the circular shape of the platform portion, and which is orthogonal to a bisector of an angle formed by the chordwise directions of the two fins; and a second reference mark disposed on a line which connects the pair of opposite positions and passes through the center of the circular shape of the platform portion, and which is parallel to the bisector of the angle formed by the chordwise directions of the two fins.

With the above configuration (3), the first reference mark and the second reference mark are disposed on lines passing through the center of the circular shape of the platform portion and extending orthogonal to each other, and thereby it is possible to match the position of the center of the circular shape of the platform portion, which is an intersection of the lines, with the mounting position of the vortex generator accurately. Thus, it is possible to position the vortex generator at the mounting position on the wind turbine blade accurately.

(4) In some embodiments, in any one of the above configurations (1) to (3), the at least one fin comprises two fins disposed adjacent to each other on the platform portion, and oriented so that chordwise directions of the two fins intersect with each other. The marks comprise: a reference mark formed along a reference line orthogonal to a bisector of an angle formed by the chordwise directions of the two fins; and an angle-indicating mark formed along a line forming a predetermined angle with the reference line.

With the above configuration (4), the vortex generator has an angle-indicating mark formed along a line forming a predetermined angle α with the reference line defining a direction indicated by the reference mark, and thereby it is possible to mount the vortex generator to the wind turbine blade at a mounting angle α with high accuracy by aligning the angle-indicating mark along the reference direction on the wind turbine blade. Accordingly, with the above configuration (4), the angle-indicating mark is disposed so as to form a predetermined angle α with the reference line, and thereby it is possible to mount the vortex generator to the wind turbine blade in a suitable mounting direction (at a mounting angle α) with respect to an inflow direction of wind with high accuracy, merely by aligning the angle-indicating mark along the reference direction on the wind turbine blade.

(5) In some embodiments, in the above configuration (4), the angle-indicating mark comprises a plurality of angle-indicating marks formed along a plurality of lines forming different angles with the reference line, respectively, and at least one of the angle-indicating marks is different in length or thickness from the reference mark and the other angle-indicating marks.

With the above configuration (5), the vortex generator includes a plurality of angle-indicating marks formed along respective lines forming different angles with the reference line defining the direction indicated by the reference mark. Accordingly, it is possible to mount the vortex generator in a suitable mounting direction (at a mounting angle α) with respect to an inflow direction of wind with high accuracy, by selecting the angle-indicating mark forming a desired angle α with the reference line from among the plurality of angle-indicating marks, and aligning the selected angle-indicating mark along the reference direction on the wind turbine blade.

Furthermore, with the above configuration (5), at least one of the plurality of angle-indicating marks is different in length or thickness from the reference mark and the other angle-indicating marks, and thereby it is possible to read the angular degree indicated by each respective angle-indicating mark accurately and readily.

(6) In some embodiments, in any one of the above configurations (1) to (5), the marks are recessed from a portion, around the marks, of the platform portion.

With the above configuration (6), the marks of the vortex generator are recessed from the portion around the marks of the platform portion, and thus the surface of the platform portion of the vortex generator becomes smooth as a result of another substance (e.g. sealant or putty) filling the recess during mounting of the vortex generator, or another substance (e.g. suspended matters in atmosphere) accumulating in the recess during operation of the wind turbine. Accordingly, during operation of the wind turbine with the vortex generator mounted to the wind turbine blade, it is possible to mitigate an influence of the marks on a wind flow that the wind turbine blade receives.

In some embodiments, in any one of the above configurations (1) to (6), a pressure surface and a suction surface of the fin have a draft in a height direction based on the platform portion.

With the above configuration (7), the pressure surface and the suction surface of the fin have a draft in the height direction based on the platform portion, and thus the vortex generator can be easily removed from a mold during production of the vortex generator by molding.

(8) A wind turbine blade according to at least one embodiment of the present invention comprises: a blade body; and the vortex generator according to any one of the above (1) to (7), mounted to a surface of the blade body.

With the above configuration (8), the vortex generator has marks disposed on at least a pair of opposite positions in an outer edge region of the platform portion, the marks indicating orientation of the vortex generator. Thus, by adjusting a mounting angle of the vortex generator so that the marks of the vortex generator form a predetermined angle with a reference direction on the wind turbine blade, it is possible to mount the vortex generator to the wind turbine blade in a suitable mounting direction with respect to an inflow direction of wind.

(9) In some embodiments, in the above configuration (8), the vortex generator is disposed on a suction surface of the blade body and within a turbulence region of a wind flow along the suction surface.

Separation of a flow at the suction surface of the wind turbine blade takes place due to a boundary layer becoming gradually thicker from a streamline flow region in the vicinity of the leading edge toward a turbulent flow region downstream thereof, and the flow being separated before arriving at the trailing edge.

In this regard, with the above configuration (9), the vortex generator is disposed within a turbulent flow region of a wind flow along the suction surface, and thereby it is possible to suppress separation of a flow from the suction surface.

(10) A wind turbine power generating apparatus according to at least one embodiment of the present invention comprises the wind turbine blade according to the above (8) or (9).

With the above configuration (10), the vortex generator has marks disposed on at least a pair of opposite positions in an outer edge region of the platform portion, the marks indicating orientation of the vortex generator. Thus, by adjusting a mounting angle of the vortex generator so that the marks of the vortex generator form a predetermined angle with a reference direction on the wind turbine blade, it is possible to mount the vortex generator to the wind turbine blade in a suitable mounting direction with respect to an inflow direction of wind.

(11) A method of mounting a vortex generator according to at least one embodiment of the present invention comprises: a step of specifying positions of at least two reference points on a wind turbine blade; and a step of mounting the vortex generator according to any one of the above (1) to (7) to the wind turbine blade so that the marks of the vortex generator are disposed on a line connecting the reference points.

In the above method (11), the vortex generator is mounted to the wind turbine blade so that the marks indicating the direction of the vortex generator are disposed on a line connecting at least two reference points specified on the wind turbine blade. Accordingly, it is possible to mount the vortex generator to the wind turbine blade in a suitable mounting direction with respect to an inflow direction of wind.

According to at least one embodiment of the present invention, provided is a vortex generator which is mountable to a wind turbine blade in a suitable mounting direction with respect to an inflow direction of wind.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
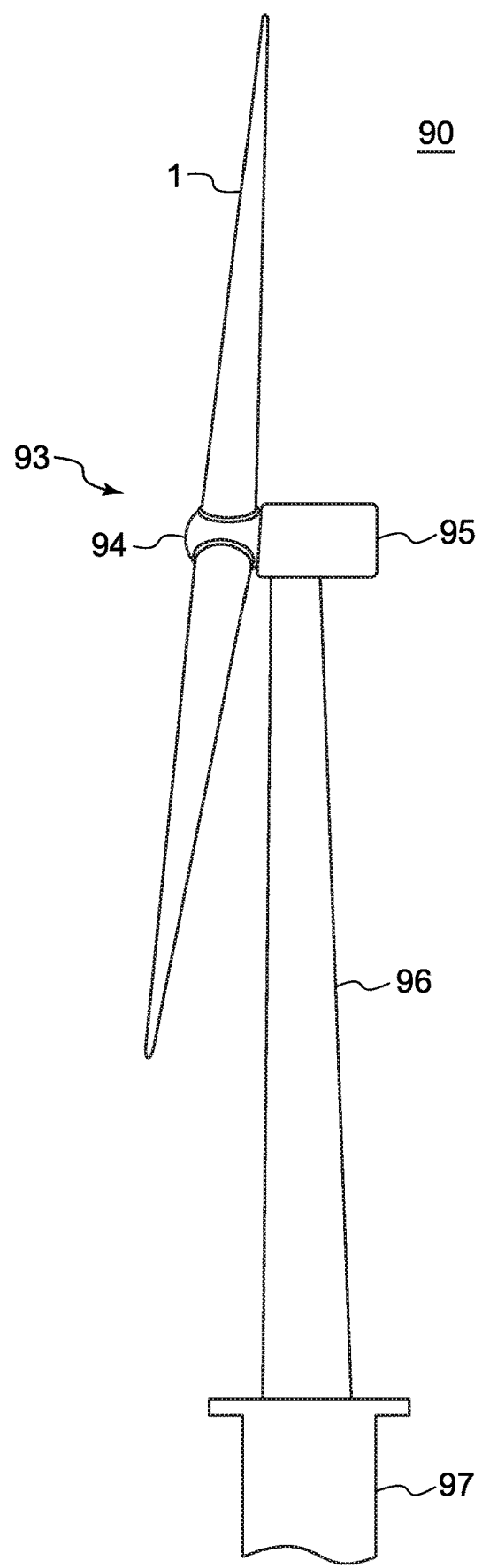
FIG. 1 is a schematic configuration diagram of a wind turbine power generating apparatus according to an embodiment.
Figure 2:
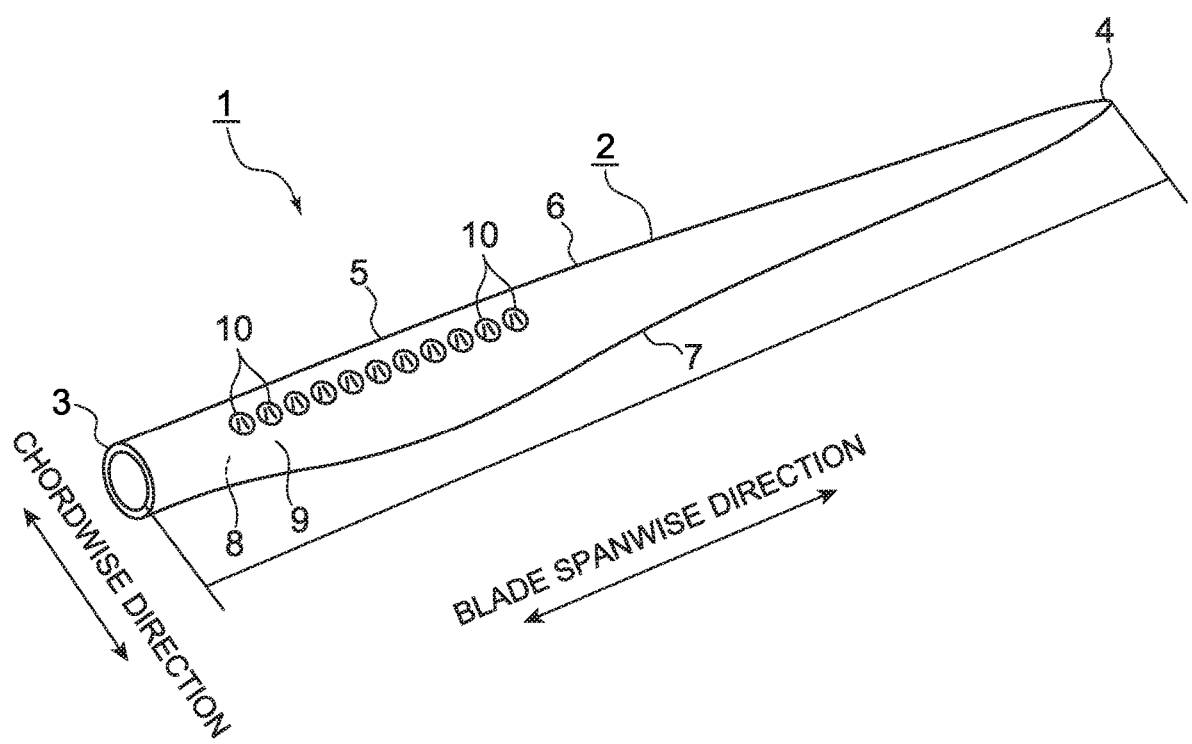
FIG. 2 is a perspective view of a wind turbine blade according to an embodiment.

With reference to FIGS. 1 and 2, an overall configuration of a wind turbine blade and a wind turbine power generating apparatus to which a vortex generator according to some embodiments is to be applied will be described. FIG. 1 is a schematic configuration diagram of a wind turbine power generating apparatus according to an embodiment. FIG. 2 is a perspective view of a wind turbine blade according to an embodiment.

As depicted in FIG. 1, a wind turbine power generating apparatus 90 includes a rotor 93 including at least one (e.g. three) wind turbine blades 1 and a hub 94. The wind turbine blades 1 are mounted to the hub 94 in a radial fashion, the rotor 93 rotates in response to wind received by the wind turbine blades 1, and a generator (not depicted) coupled to the rotor 93 generates electric power.

In the embodiment depicted in FIG. 1, the rotor 93 is supported by a nacelle 95 disposed on an upper part of a tower 96. The tower 96 is disposed to stand upright on a base structure 97 (e.g. foundation structure or floating structure) disposed onshore or offshore.

As described below, vortex generators according to an embodiment is mounted to the wind turbine blades 1 of the wind turbine power generating apparatus 90.

As depicted in FIG. 2, the wind turbine blade 1 includes a blade body 2 and a vortex generator 10 mounted to a surface (blade surface) of the blade body 2.

The blade body 2 includes a blade root 3 to be attached to the hub 94 of the wind turbine power generating apparatus 90, a blade tip 4 positioned farthest from the hub 94, and an airfoil part 5 extending between the blade root 3 and the blade tip 4. The wind turbine blade 1 has a leading edge 6 and a trailing edge 7 from the blade root 3 to the blade tip 4. Further, an exterior shape of the wind turbine blade 1 is formed by a pressure surface 8 and a suction surface 9 disposed opposite to the pressure surface 8.

With regard to the wind turbine blade 1 depicted in FIG. 2, a plurality of the vortex generators 10 is mounted to the suction surface 9 of the blade body 2. More specifically, the plurality of vortex generators 10 is mounted to the suction surface 9 of the blade body 2 in a blade spanwise direction.

In the present specification, "blade spanwise direction" refers to a direction connecting the blade root 3 and the blade tip 4, and "blade chordwise direction" refers to a direction along a line (chord) connecting the leading edge 6 and the trailing edge 7 of the blade body 2.

Next, a vortex generator according to some embodiments will be described in detail with reference to FIGS. 3A to 7.

Figure 3A:
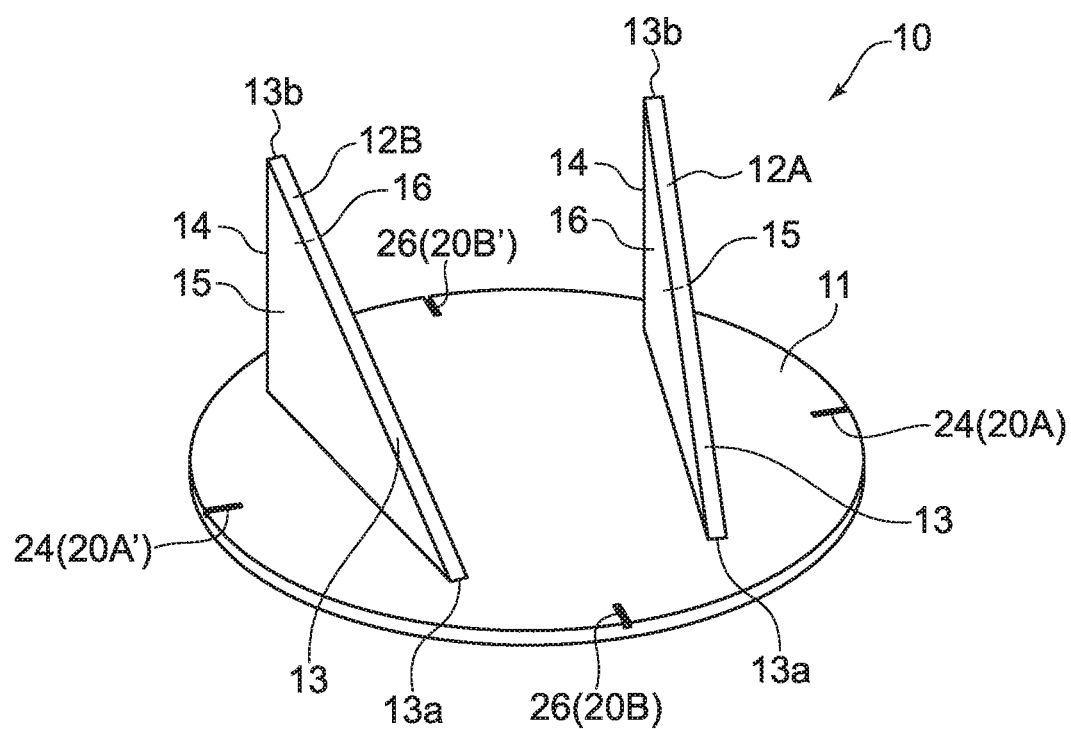
FIG. 3A is a perspective view of a vortex generator according to an embodiment.
Figure 3B:
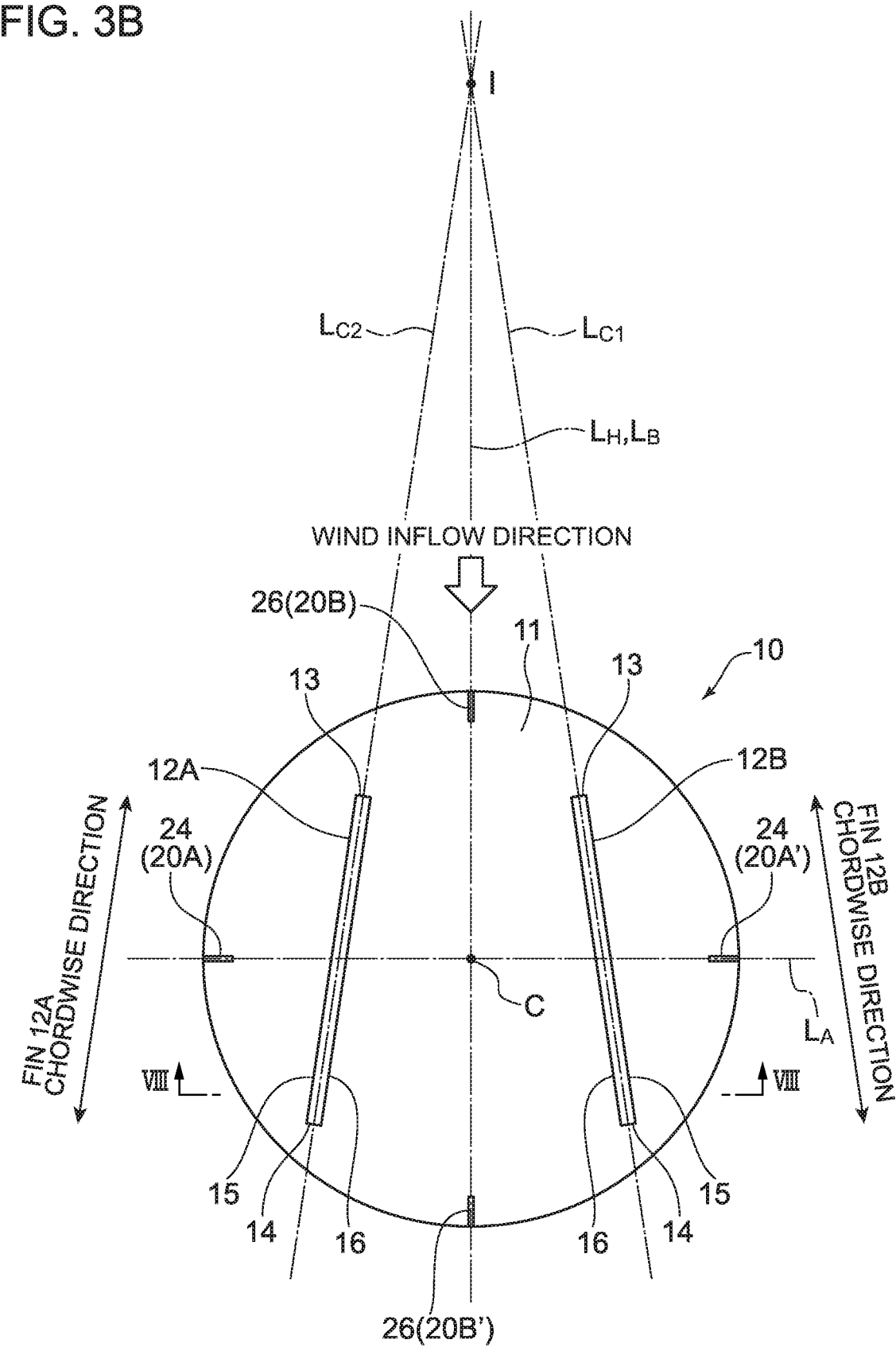
FIG. 3B is a top view of a vortex generator depicted in FIG. 3A.
Figure 4A:
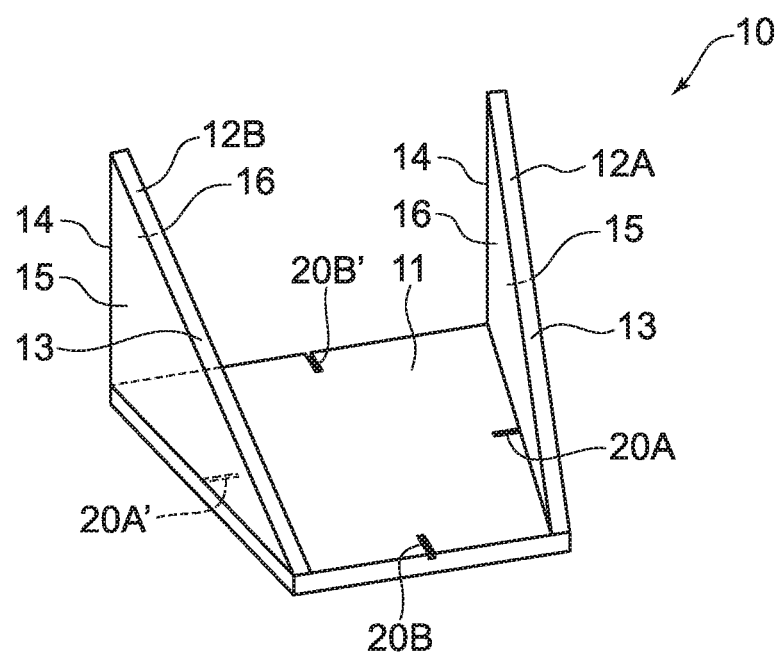
FIG. 4A is a perspective view of a vortex generator according to an embodiment.
Figure 4B:
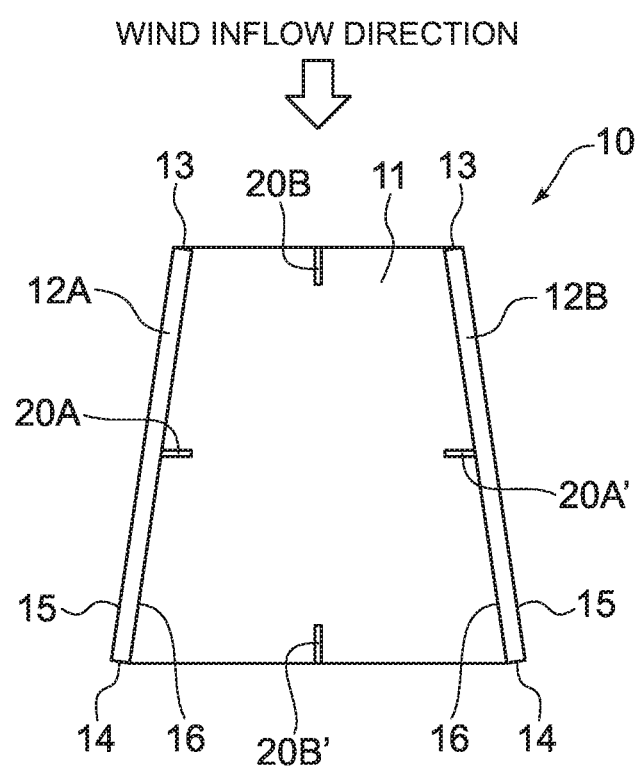
FIG. 4B is a top view of a vortex generator depicted in FIG. 4A.
Figure 5:
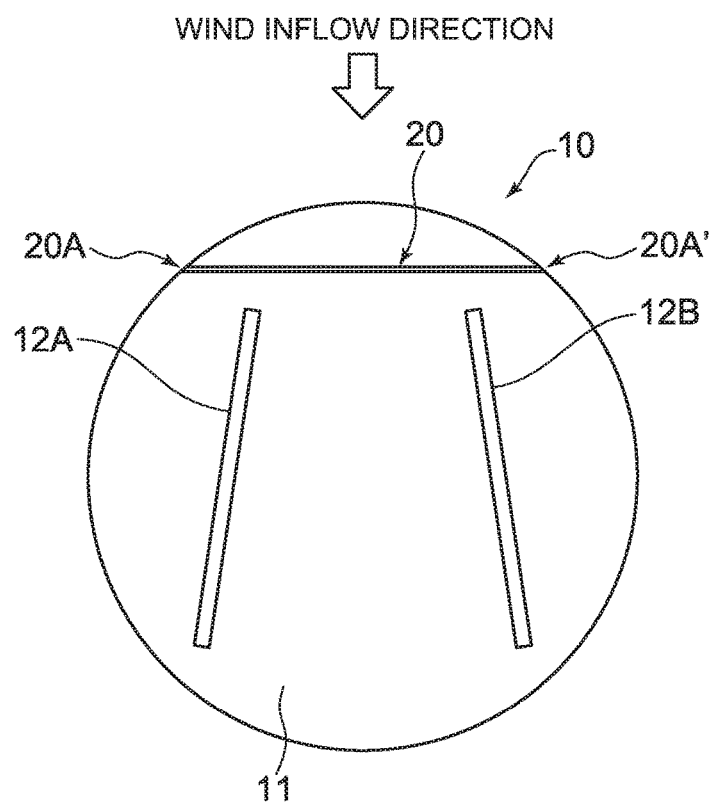
FIG. 5 is a top view of a vortex generator according to an embodiment.
Figure 6:
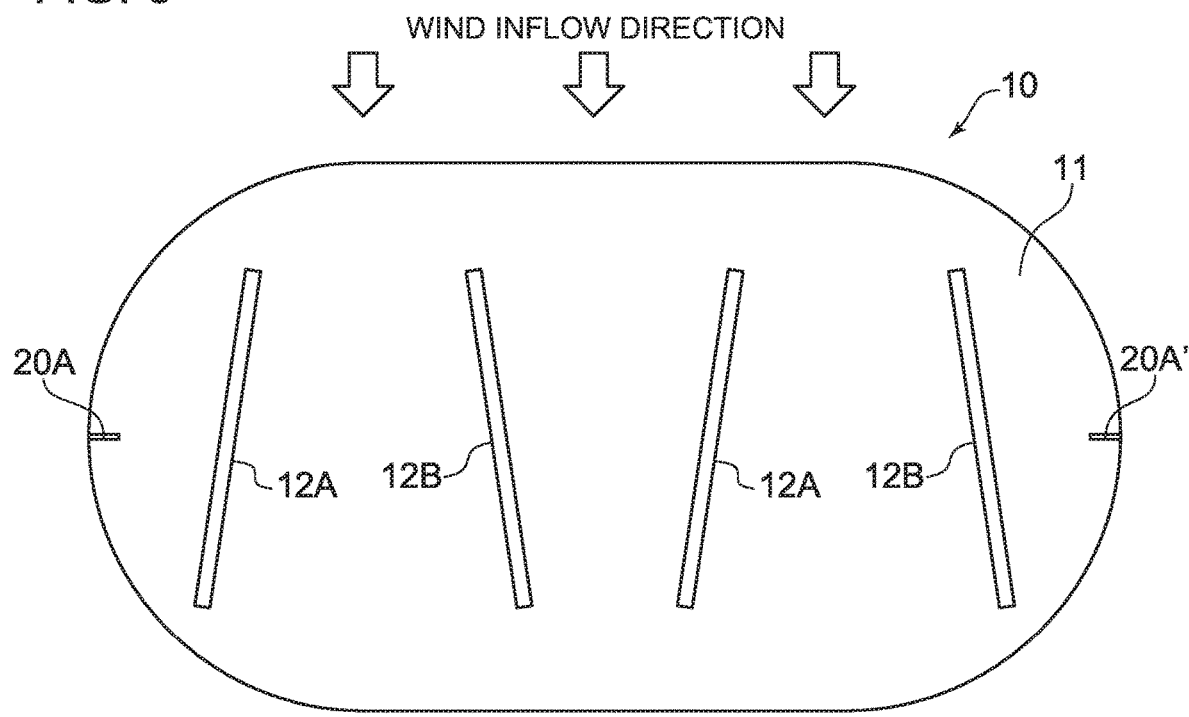
FIG. 6 is a top view of a vortex generator according to an embodiment.
Figure 7:
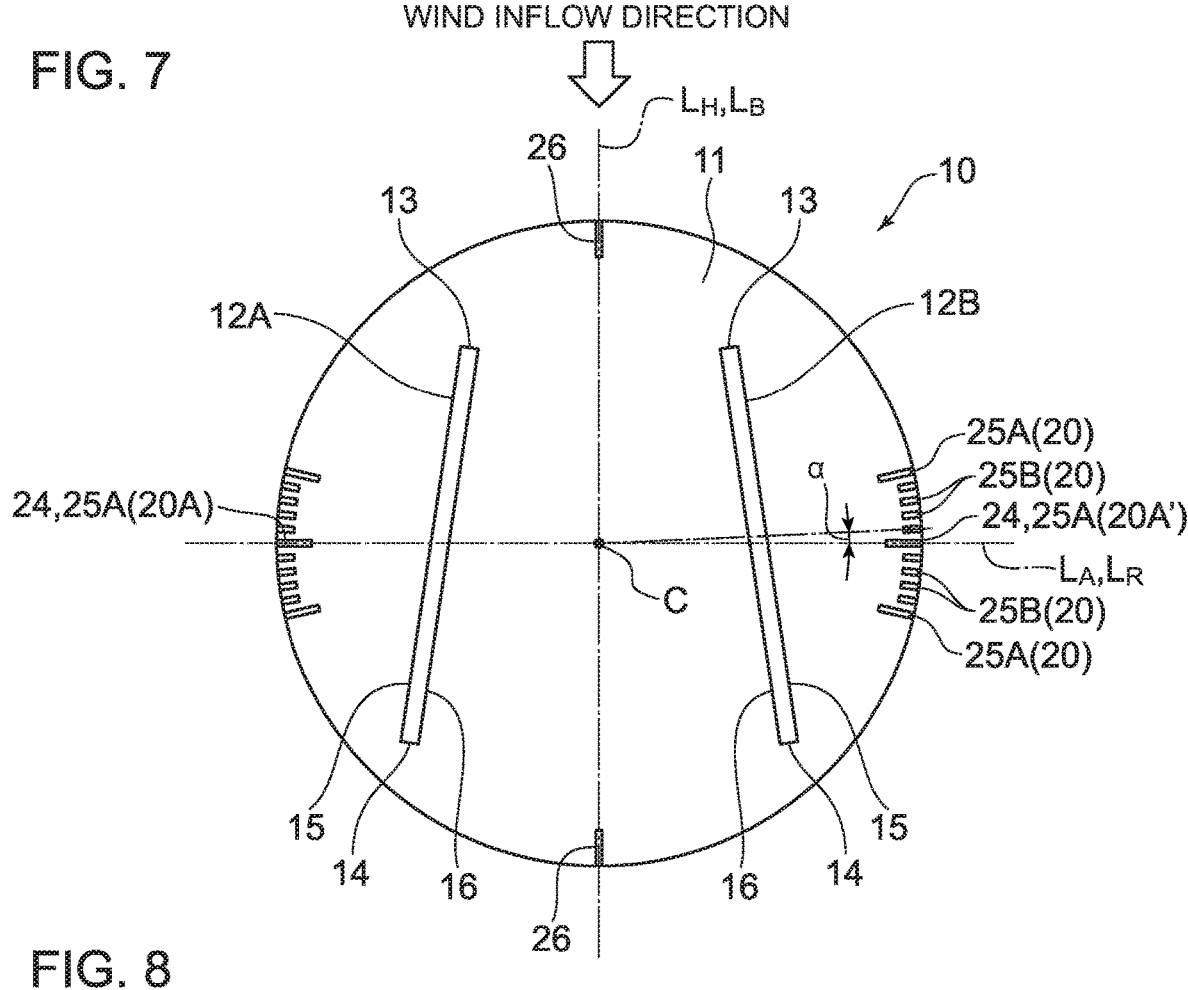
FIG. 7 is a top view of a vortex generator according to an embodiment.

FIGS. 3A and 4A are each a perspective view of the vortex generator 10 according to an embodiment, and FIGS. 3B and 4B are each a top view of the vortex generator 10 depicted in FIGS. 3A and 4A, respectively. FIGS. 5 to 7 are each a top view of the vortex generator 10 according to an embodiment.

The vortex generator 10 includes a platform portion 11 to be fixed to a surface of the wind turbine blade 1 (more specifically, to a surface of the blade body 2) and at least one fin 12 disposed upright on the platform portion 11. In the embodiment depicted in FIGS. 3A to 5, and 7, the vortex generator 10 includes a pair (two in total) of fins 12 (12A, 12B) disposed so as to be adjacent to each other on the platform portion 11. Furthermore, in the embodiment depicted in FIG. 6, the vortex generator 10 includes two pairs (four in total) of fins 12 (12A, 12B) disposed so as to be adjacent to each other on the platform portion 11.

In the embodiment depicted in FIGS. 3A, 3B, 5, and 7, the platform portion 11 has a circular shape in a top view. In the embodiment depicted in FIGS. 4A and 4B, the platform portion 11 has a trapezoidal shape in a top view.

In some embodiments, the platform portion 11 may have a shape other than a circle or a trapezoid. For instance, the platform portion 11 may have an oval shape as depicted in FIG. 6, or may have a polygonal shape such as a rectangular shape, or another shape.

In an embodiment illustrated in FIGS. 3A to 7, the fin 12 has an airfoil shape. The fin 12 includes a leading edge 13 disposed on an upstream side with respect to the inflow direction of wind, a trailing edge 14 disposed on a downstream side with respect to the inflow direction of wind, a pressure surface 15 of the fin 12 facing toward upstream with respect to the inflow direction of wind, and a suction surface 16 of the fin 12 facing toward downstream with respect to the inflow direction of wind. In this fin 12, the direction of a line connecting the leading edge 13 and the trailing edge 14 is the chordwise direction of the fin 12.

In some embodiments, the fin 12 is disposed inclined from the inflow direction of wind at a predetermined angle.

For instance, in the vortex generator 10 depicted in FIGS. 3A to 7, each of the fins 12A, 12B is disposed so that a gap between the pair of fins 12A, 12B widens from upstream toward downstream with respect to the inflow direction of wind (i.e., from the side of the leading edge 6 toward the side of the trailing edge 7 of the wind turbine blade 1 (see FIG. 2)).

In some embodiments, each of the fins 12A, 12B may be disposed so that a gap between the pair of fins 12A, 12B widens from downstream toward upstream with respect to the inflow direction of wind (i.e., from the side of the trailing edge 7 toward the side of the leading edge 6 of the wind turbine blade 1 (see FIG. 2)).

A function of the vortex generator 10 will now be described briefly.

Separation of a flow at the suction surface 9 of the wind turbine blade 1 takes place due to a boundary layer becoming gradually thicker from a streamline flow region in the vicinity of the leading edge 6 toward a turbulent flow region downstream thereof, and the flow being separated before arriving at the trailing edge 7.

The vortex generator 10 mounted to the wind turbine blade 1 normally generates a longitudinal vortex on the side of the suction surface 16 of the fin 12 with a lift produced by the fin 12. Further, in response to a flow flowing into the fin 12, a longitudinal vortex is generated along an edge extending from the upstream-most position 13a toward the top portion 13b of the leading edge 13 of the fin 12. The longitudinal vortices generated by the fin 12 promote momentum exchange between outside and inside of a boundary layer on a surface of the wind turbine blade 1, in a height direction of the fin 12, at a downstream side of the vortex generator 10. Accordingly, the boundary layer on the surface of the wind turbine blade 1 reduces in thickness, and thereby trailing-edge separation of the wind turbine blade 1 is suppressed.

In some embodiments, the vortex generator 10 is disposed within a turbulent flow region of a wind flow along the suction surface 9, on the suction surface 9 of the blade body 2. As described above, the vortex generator 10 is disposed within a turbulent flow region of a wind flow along the suction surface 9, and thereby it is possible to suppress separation of a flow from the suction surface 9.

In the embodiment depicted in FIGS. 3A to 7, the platform portion 11 has marks 20 which indicate orientation of the vortex generator, disposed on at least a pair of opposite positions in an outer edge region of the platform portion 11.

The outer edge region of the platform portion 11 is a peripheral region of the contour of the platform portion in a planar view. The outer edge region of the platform portion 11 is, for instance, the peripheral region of the contour of the circular shape of the platform portion 11 in the example depicted in FIGS. 3A and 3B, and the peripheral region of the contour of the trapezoidal shape of the platform portion 11 in the example depicted in FIGS. 4A and 4B.

Furthermore, a pair of opposite positions in the outer edge region of the platform portion 11 is a pair of positions facing each other across an inner region surrounded by the outer edge region, the positions being disposed within the outer edge region of the platform portion 11. For instance, in FIGS. 3A to 7, the pair of the mark 20A and the mark 20A', and the pair of the mark 20B and the mark 20B', are each a pair of marks disposed on a pair of opposite positions in the outer edge region of the platform portion 11.

A direction indicated by the marks 20 disposed on a pair of opposite positions in the outer edge region of the platform portion 11, which is a direction of a line mutually connecting the pair of opposite directions, forms a particular angle with the orientation (installation direction) of the fin 12 on the platform portion 11. Thus, the marks 20 disposed on a pair of opposite positions in the outer edge region of the platform portion 11 indirectly indicate the orientation of the fin 12 on the platform portion 11, and thus indicate the orientation of the vortex generator 10.

During operation, wind normally flows into the wind turbine power generating apparatus 90 from the leading edge 6 toward the trailing edge 7 of the wind turbine blade 1. Thus, for the wind turbine blade 1, by defining in advance a reference direction that serves as a reference of a mounting direction of the vortex generator 10, and adjusting a mounting angle of the vortex generator 10 so that a direction indicated by the marks 20 of the vortex generator 10 forms a predetermined angle with the reference direction, it is possible to mount the vortex generator 10 to the wind turbine blade 1 in a suitable mounting direction with respect to the inflow direction of wind.

A suitable mounting direction of the vortex generator 10 on the wind turbine blade 1 can be determined on the basis of fluid analysis, for instance. Furthermore, a predetermined angle formed between the marks 20 of each vortex generator 10 and the reference direction on the wind turbine blade 1 can be determined on the basis of the reference direction defined for the wind turbine blade 1 and a suitable mounting direction determined in advance by fluid analysis or the like.

The mark 20 may be a pair of marks formed on a pair of opposite positions, respectively, in the outer edge region of the platform portion 11 as depicted in FIGS. 3A to 4B, 6, and 7. Alternatively, the mark 20 may be provided as a mark 20 of a linear shape connecting marks 20A, 20A' at a pair of opposite positions in the outer edge region of the platform portion 11 as depicted in FIG. 5.

In some embodiments, the platform portion 11 has a circular shape in a top view, and a line connecting a pair of opposite positions at which the marks 20 are formed passes through the center of the circular shape of the platform portion 11.

For instance, in the embodiment depicted in FIGS. 3A, 3B, and 7, a line $L_A$ connecting a pair of opposite positions at which the mark 20A and the mark 20A' are respectively provided passes through the center C of the circular shape of the platform portion 11. Furthermore, in the embodiment, a line $L_B$ connecting a pair of opposite positions at which the mark 20B and the mark 20B' are respectively provided passes through the center C of the circular shape of the platform portion 11.

Accordingly, with a line (e.g. $L_A$ or $L_B$ depicted in FIGS. 3B and 7) that connects a pair of opposite positions at which the marks 20 are respectively formed on the platform portion 11 having a circular shape in a top view passing through the center C of the platform portion 11, it is possible to specify the center position of the circular shape of the platform portion 11 in a direction orthogonal to the line on a blade surface of the wind turbine blade 1. Thus, it is possible to position the vortex generator 10 at the mounting position on the wind turbine blade 1, by making use of the marks 20 on the platform portion 11.

In the embodiment depicted in FIGS. 3A to 7, the pair of fins 12 (12A, 12B) disposed adjacent to each other on the platform portion 11 is oriented so that respective chordwise directions of the fins 12 intersect with each other. For instance, with reference to FIG. 3B, the pair of fins 12 (12A, 12B) is disposed on the platform portion 11 so that respective lines connecting the leading edge 13 and the trailing edge 14 of the fins 12A, 12B (lines $L_{C1}$, $L_{C2}$ extending in respective chordwise directions) intersect with each other at an intersection I.

In an embodiment depicted in FIGS. 3A, 3B, and 7, the marks 20 disposed on the platform portion 11 include a reference mark (first reference mark) 24 and a reference mark (second reference mark) 26.

Herein, the reference mark (first reference mark) 24 is the mark 20 disposed on a line which connects a pair of opposite positions (positions of a pair of marks 20 facing each other) passing through the center C of the circular shape of the platform portion 11, and which is orthogonal to a bisector $L_H$ (see FIG. 3B) of an angle formed by chordwise directions of the two fins 12 (12A, 12B). Furthermore, the reference mark (second reference mark) 26 is the mark 20 disposed on a line which connects a pair of opposite positions (positions of a pair of marks 20 facing each other) passing through the center C of the circular shape of the platform portion 11, and which is parallel to a bisector $L_H$ of an angle formed by chordwise directions of the two fins 12 (12A, 12B).

Describing with reference to FIG. 3B, the line $L_A$ connecting a pair of opposite positions at which the mark 20A and the mark 20A' are respectively disposed is a line which passes through the center C of the circular shape of the platform portion 11, and which is orthogonal to the bisector $L_H$ of an angle formed by chordwise directions of the two fins 12 (12A, 12B) (an angle formed by lines $L_{C1}$, $L_{C2}$ extending in respective chordwise directions). Furthermore, the mark 20A and the mark 20A' are each a reference mark (first reference mark) 24 disposed on the line $L_A$.

The line $L_B$ connecting a pair of opposite positions at which the mark 20B and the mark 20B' are respectively disposed is a line which passes through the center C of the circular shape of the platform portion 11, and which is parallel to the bisector $L_H$ of an angle formed by chordwise directions of the two fins 12 (12A, 12B) (an angle formed by lines $L_{C1}$, $L_{C2}$ extending in respective chordwise directions). Furthermore, the mark 20B and the mark 20B' are each a reference mark (second reference mark) 26 disposed on the line $L_B$.

Also in the embodiment depicted in FIG. 7, similarly to the embodiment depicted in FIGS. 3A and 3B, the platform portion 11 of a circular shape includes a reference mark (first reference mark) 24 and a reference mark (second reference mark) 26.

The reference mark (first reference mark) 24 and the reference mark (second reference mark) 26 are disposed on lines (lines $L_A$, $L_B$ in FIG. 3B) passing through the center C of the circular shape of the platform portion 11 and extending orthogonal to each other, and thereby it is possible to match the position of the center C of the circular shape of the platform portion 11, which is an intersection of the lines $L_A$, $L_B$, with the mounting position of the vortex generator 10 with high accuracy. Accordingly, with the platform portion 11 having the reference mark (first reference mark) 24 and the reference mark (second reference mark) 26, it is possible to position the vortex generator 10 at the mounting position on the wind turbine blade 1 with high accuracy.

In the embodiment depicted in FIG. 7, the platform portion 11 includes the reference mark 24 and an angle-indicating mark 25 (25A, 25B).

The reference mark 24 is a mark 20 formed along a reference line $L_R$ orthogonal to a bisector $L_H$ of an angle formed by chordwise directions of the two fins 12 (12A, 12B).

In the embodiment depicted in FIG. 7, the reference line $L_R$ is a line passing through the center C of the circular shape of the platform portion 11, and is the same line as the line $L_A$ connecting the pair of opposite positions at which the mark 20A and the mark 20A' are respectively disposed. Further, in the embodiment depicted in FIG. 7, the platform portion 11 has a circular shape and thus the reference mark 24 is equivalent to the first reference mark 24 described above, and thus is associated with the same reference numeral.

The angle-indicating mark 25 is a mark 20 formed along a line forming a predetermined angle α with the reference line $L_R$.

With the angle-indicating mark 25 formed on the platform portion 11 along a line forming a predetermined angle α with the reference line $L_R$, it is possible to mount the vortex generator 10 to the wind turbine blade 1 at a mounting angle α with high accuracy by aligning the angle-indicating mark 25 in the reference direction on the wind turbine blade 1.

In the embodiment depicted in FIG. 7, the platform portion 11 includes a plurality of angle-indicating marks 25 disposed along respective lines which form different angles with the reference line $L_R$ (herein, angles about the center C of the circular shape of the platform portion 11). In other words, angle-indicating marks 25 corresponding to a plurality of determined angles α are formed on the platform portion 11.

In the embodiment depicted in FIG. 7, the plurality of angle-indicating marks 25 are disposed at regular angular intervals. In other words, the angle-indicating marks 25 are each formed along a line which forms a predetermined angle α (angle formed with the reference line $L_R$ (angle about the center C of the circular shape of the platform portion 11)) of n×a (n is an integer and a>0°). For instance, if a=1° is satisfied, the angular interval of the angle-indicating marks 25 is 1°.

The reference mark 24 in the embodiment depicted in FIG. 7 is an angle-indicating mark 25 along a line that forms a predetermined angle α (an angle formed with the reference line $L_R$) of 0° (i.e., an angle in the case of n=0 in the above expression).

With the plurality of angle-indicating marks 25 formed on the platform portion 11 as described above, it is possible to mount the vortex generator 10 in a suitable mounting direction (at a mounting angle α) with respect to the inflow direction of wind with high accuracy, by selecting the angle-indicating mark 25 forming a desired angle α with the reference line $L_R$ from among the plurality of angle-indicating marks 25, and aligning the angle-indicating mark 25 in the reference direction on the wind turbine blade 1.

In some embodiments, at least one of the plurality of angle-indicating marks 25 is different in length or thickness from the reference mark 24 and the other angle-indicating marks 25.

For instance, in the embodiment depicted in FIG. 7, among the plurality of angle-indicating marks 25 formed in the vicinity of the reference mark 24, relatively-longer angle-indicating marks 25A (including the reference mark 24) are disposed at intervals of five marks (e.g. if a=1°, at every 5°), while four relatively-shorter angle-indicating marks 25B are disposed between adjacent two of the relatively-longer angle-indicating marks 25A at intervals of a° (e.g. if a=1°, at every 1°).

In another embodiment, for instance, the relatively-longer angle-indicating marks 25 and the relatively-shorter angle-indicating marks 25 may be disposed alternately.

As described above, with at least one of the plurality of angle-indicating marks 25 (in FIG. 7, the angle-indicating marks 25B) being different in length or thickness from the reference mark 24 and the other angle-indicating marks 25 (in FIG. 7, the angle-indicating marks 25A), it is possible to read the angular degree indicated by each angle-indicating mark 25 accurately and readily.

In some embodiments, the marks 20 (e.g. the reference marks 24, 26 or the angle-indicating marks 25) are recessed from the peripheral portion of the mark 20 on the platform portion 11. For instance, as depicted in FIG. 3A, the marks 20 may be formed on the platform portion 11 as grooves recessed from the surface of the platform portion 11.

In this case, the surface of the platform portion 11 of the vortex generator 10 becomes smooth as a result of another substance (e.g. sealant or putty) filling the recess corresponding to the marks 20 on the platform portion 11 during mounting of the vortex generator 10, or another substance (e.g. suspended matters in atmosphere) accumulating in the recess corresponding to the marks 20 during operation of the wind turbine power generating apparatus 90. Accordingly, during operation of the wind turbine power generating apparatus 90 with the vortex generator 10 mounted to the wind turbine blade 1, it is possible to reduce an influence from the marks 20 on a wind flow that the wind turbine blade 1 receives.

Furthermore, the angle-indicating marks 25 may be disposed in the vicinity of the pair of reference marks (first reference marks) 24 (marks 20A, 20A') as depicted in FIG. 7. Alternatively, the angle-indicating marks 25 may be disposed in the vicinity of the pair of reference marks (second reference marks) 26 (marks 20B, 20B').

Furthermore, the angle-indicating marks 25 may be disposed in the vicinity of either one mark 20 of the pair of opposite reference marks 24 (marks 20A, 20A'), or one mark 20 of the pair of opposite reference marks 26 (20B, 20B').

In some embodiments, the pressure surface 15 and the suction surface 16 of the fin 12 have a draft in the height direction based on the platform portion 11.

Figure 8:
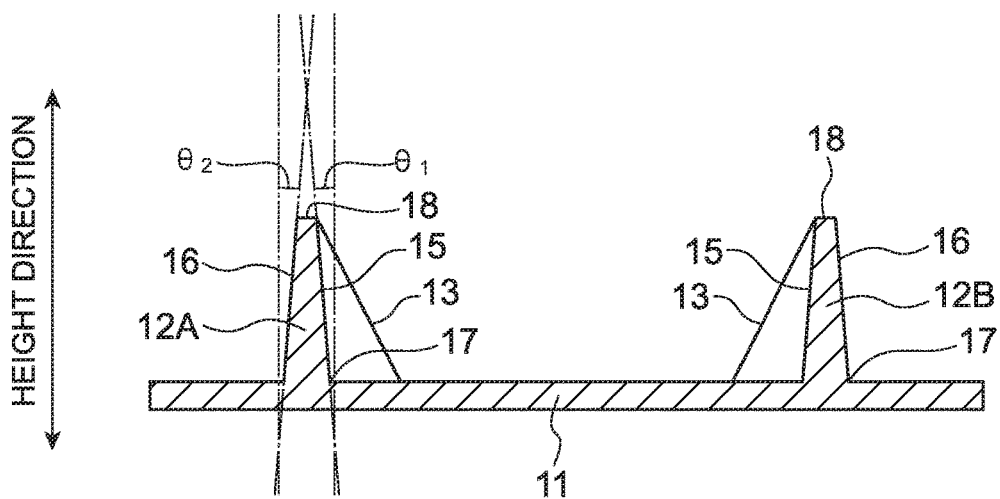
FIG. 8 is a cross-sectional view of a vortex generator taken along line VIII-VIII in FIG. 3B.

FIG. 8 is a cross-sectional view of the vortex generator 10 taken along line VIII-VIII in FIG. 3B. For instance, as depicted in FIG. 8, the angles of the pressure surface 15 and the suction surface 16 are inclined by angular degrees $\theta_1$, $\theta_2$, respectively, from the height direction based on the platform portion 11 (a direction perpendicular to the platform portion 11), so that the thickness of the fin 12 reduces gradually toward a top portion 18 from a root portion 17 of the fin 12, at the trailing edge 14 of the fin 12.

As described above, the pressure surface 15 and the suction surface 16 of the fin 12 have a draft in the height direction based on the platform portion 11, and thus the vortex generator 10 can be easily removed from a mold during production of the vortex generator 10 by molding.

Next, a method of mounting the vortex generator 10 to the wind turbine blade 1 (blade body 2) according to some embodiments will be described in detail with reference to FIGS. 9 to 12. FIGS. 9 to 12 are each a diagram for describing a method of mounting the vortex generator 10.

While the vortex generator 10 is mounted to the suction surface 9 of the wind turbine blade 1 (blade body 2) in the following description as an example, the vortex generator 10 can be mounted to the pressure surface 8 of the wind turbine blade 1 by a similar method.

(Specifying Reference Points on a Surface of the Wind Turbine Blade)

In the method of mounting the vortex generator 10 according to an embodiment, the positions of reference points $P_1$ and $P_2$ are specified on the blade surface (suction surface 9) of the wind turbine blade 1.

A reference point is a point for determining a reference direction which serves as a reference of a mounting direction of the vortex generator 10. The positions of the two reference points $P_1$, $P_2$ on the blade surface of the wind turbine blade 1 are, for instance, specified on the basis of the mounting position of the vortex generator 10 determined in advance by fluid analysis or the like.

A reference point can be, for instance, represented by coordinates (z, l) in the blade spanwise direction and the chordwise direction on the blade surface of the wind turbine blade 1. Using the coordinate system, the coordinates of the reference points $P_1$ and $P_2$ determined in advance are represented by $P_1$ $(z_1, l_1)$ and $P_2$ $(z_2, l_2)$, respectively.

Figure 9:
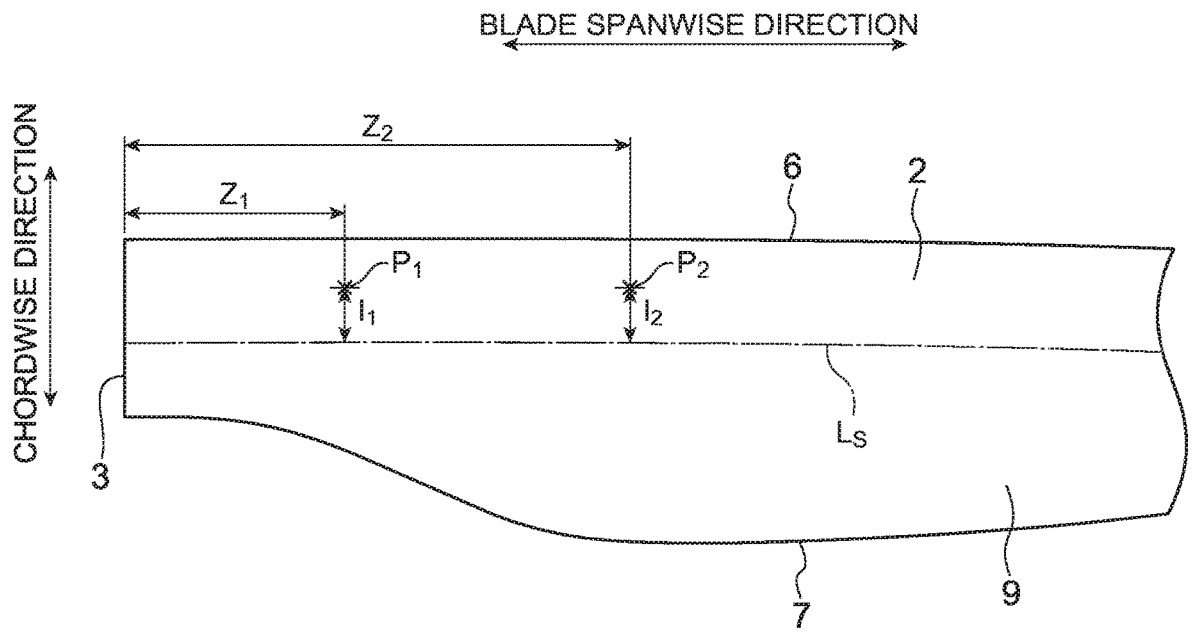
FIG. 9 is a diagram for describing a method of mounting a vortex generator.

As depicted in FIG. 9, with regard to the positions in the chord direction of the reference points $P_1$ and $P_2$, the positions corresponding to l coordinates (i.e., $l_1$ and $l_2$) of the reference points $P_1$ and $P_2$ can be specified on the blade surface by measuring the lengths from a blade spanwise directional line Ls along the blade spanwise direction on the blade surface.

In FIG. 9, the blade spanwise directional line Ls is a line extending in the blade spanwise direction at a position between the leading edge 6 and the trailing edge 7 in the chord direction on the blade surface (suction surface 9). The line Ls can be drawn with reference to the position of a member (e.g. receptor) mounted to a specific position on the blade surface, for instance. In another embodiment, the trailing edge 7 of the wind turbine blade 1 may be used as the blade longitudinal directional line Ls.

Alternatively, for the positions of the reference points $P_1$ and $P_2$ in the blade spanwise direction, the positions corresponding to z coordinates (i.e. $z_1$ and $z_2$) of the reference points $P_1$ and $P_2$ can be specified on the blade surface by measuring a distance from the blade root 3 with reference to the blade root 3 by laser measurement or the like.

(Mounting the Vortex Generator)

Next, the vortex generator 10 is mounted to the wind turbine blade 1, so that the marks 20 representing orientation of the vortex generator 10 are disposed on the line $L_{ref}$ connecting the reference points $P_1$ and $P_2$.

Herein, the line $L_{ref}$ connecting the reference points $P_1$ and $P_2$ is a line representing a reference direction during mounting of the vortex generator 10 to the wind turbine blade 1. The line $L_{ref}$ may be displayed on the blade surface of the wind turbine blade 1 visually by using a tape or a pen, or by marking off, for instance.

Furthermore, the marks 20 disposed on the line $L_{ref}$ during mounting of the vortex generator 10 may be the reference marks 24, or the angle-indicating marks 25.

Figure 10:
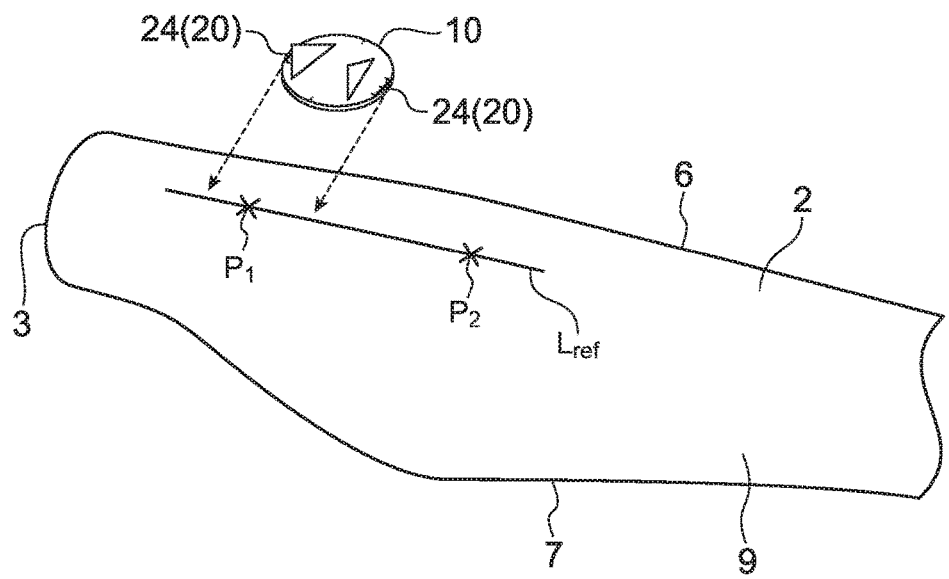
FIG. 10 is a diagram for describing a method of mounting a vortex generator.
Figure 11A:
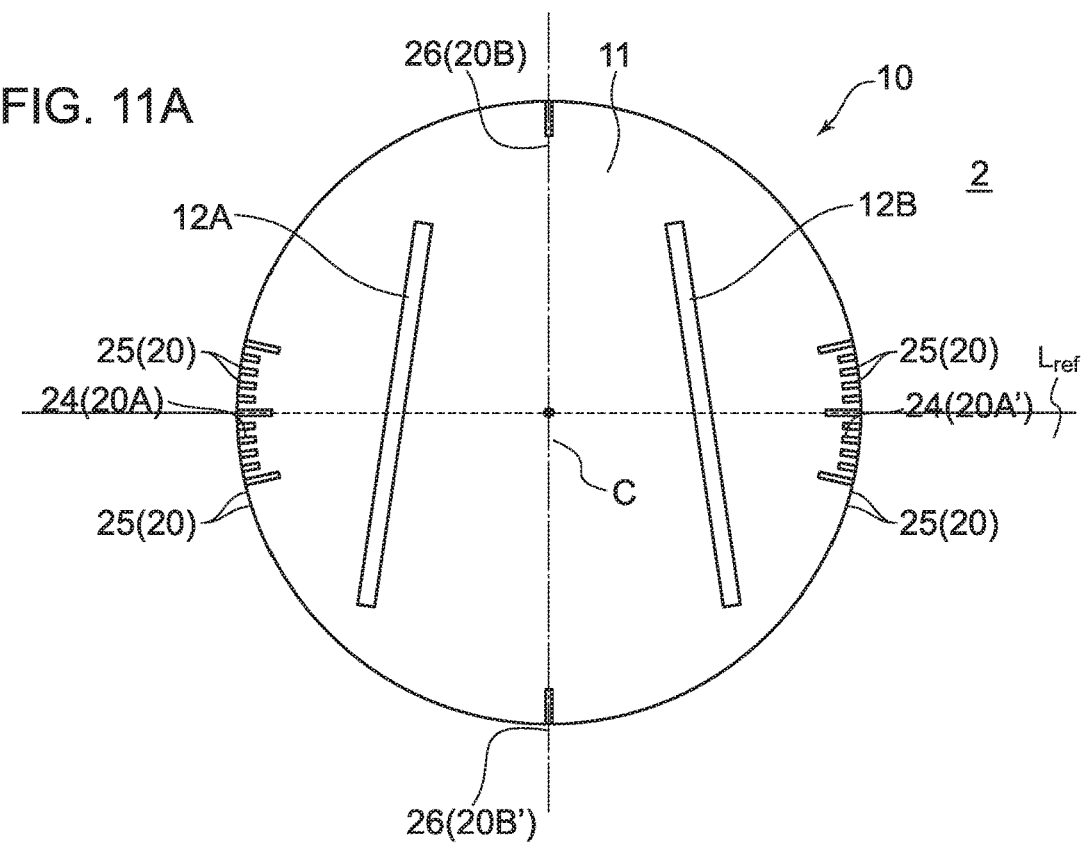
FIG. 11A is a diagram for describing a method of mounting a vortex generator.
Figure 11B:
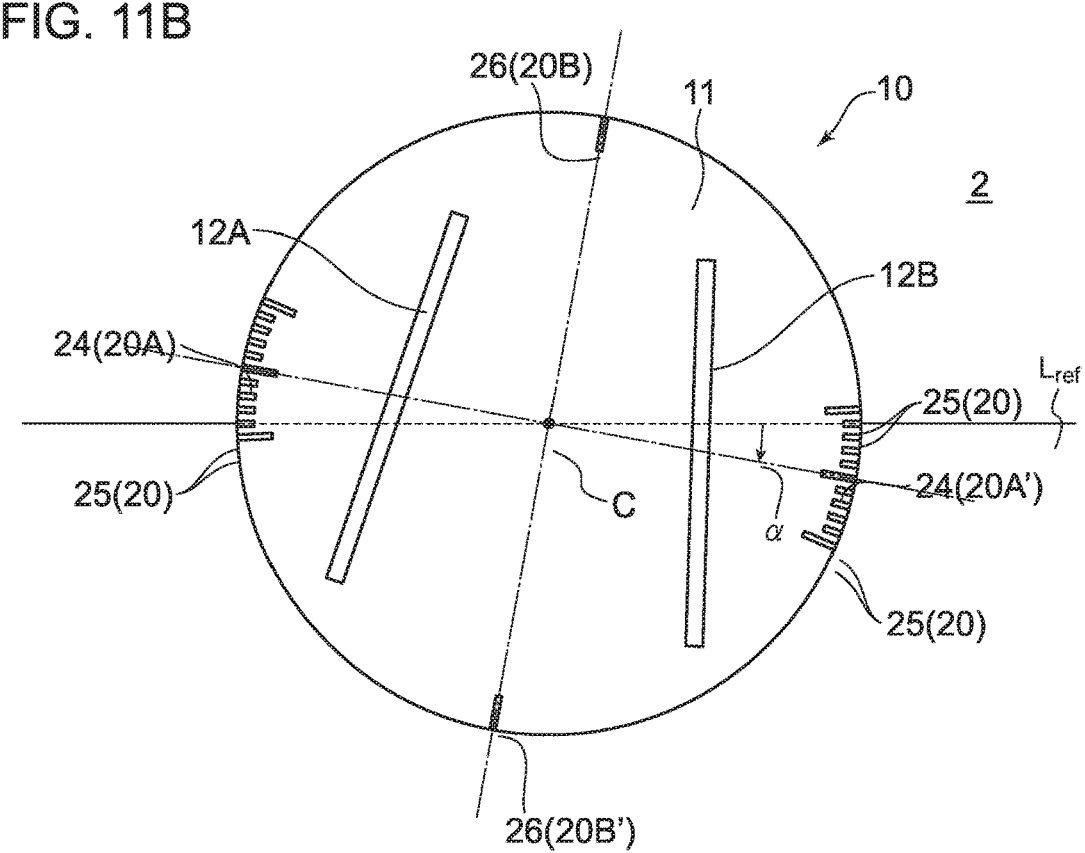
FIG. 11B is a diagram for describing a method of mounting a vortex generator.

In the case illustrated in FIGS. 10 to 11B, the vortex generator 10 having the reference marks 24 and the angle-indicating marks 25 is mounted to the wind turbine blade 1 so that the angle-indicating marks 25 are disposed on the line $L_{ref}$.

As depicted in FIG. 10, the vortex generator 10 is located on the surface of the wind turbine blade 1 in such a way that the pair of reference marks 24 is aligned along the line $L_{ref}$. At this time, the vortex generator 10 is located in such a way that a reference point (e.g. the center C of the platform portion 11 having a circular shape) of the vortex generator 10 is at a predetermined mounting position in the blade spanwise direction. The mounting position of the vortex generator 10 in the blade spanwise direction may be determined in advance on the basis of fluid analysis or the like. Furthermore, the mounting position of the vortex generator 10 in the blade spanwise direction may be the same as the reference point $P_1$ or the reference point $P_2$.

In FIG. 11A, depicted is the vortex generator 10 located on the blade surface of the wind turbine blade 1 as described above.

Next, as depicted in FIG. 11B, the mounting angle of the vortex generator 10 is adjusted by revolving the vortex generator 10 about the center C by a predetermined mounting angle α. At this time, the vortex generator 10 is rotated about the center C so that the angle-indicating marks 25, which form an angle α with the direction indicated by the reference marks 24, is aligned along the line $L_{ref}$.

The predetermined mounting angle α may be determined in advance on the basis of fluid analysis or the like.

The mounting position and the mounting angle of the vortex generator 10 on the wind turbine blade 1 are adjusted as described above, and then the vortex generator 10 is fixed to the wind turbine blade 1. At this time, the vortex generator 10 may be fixed to the wind turbine blade 1 by using an adhesive agent or a double-sided adhesive tape.

Figure 12:
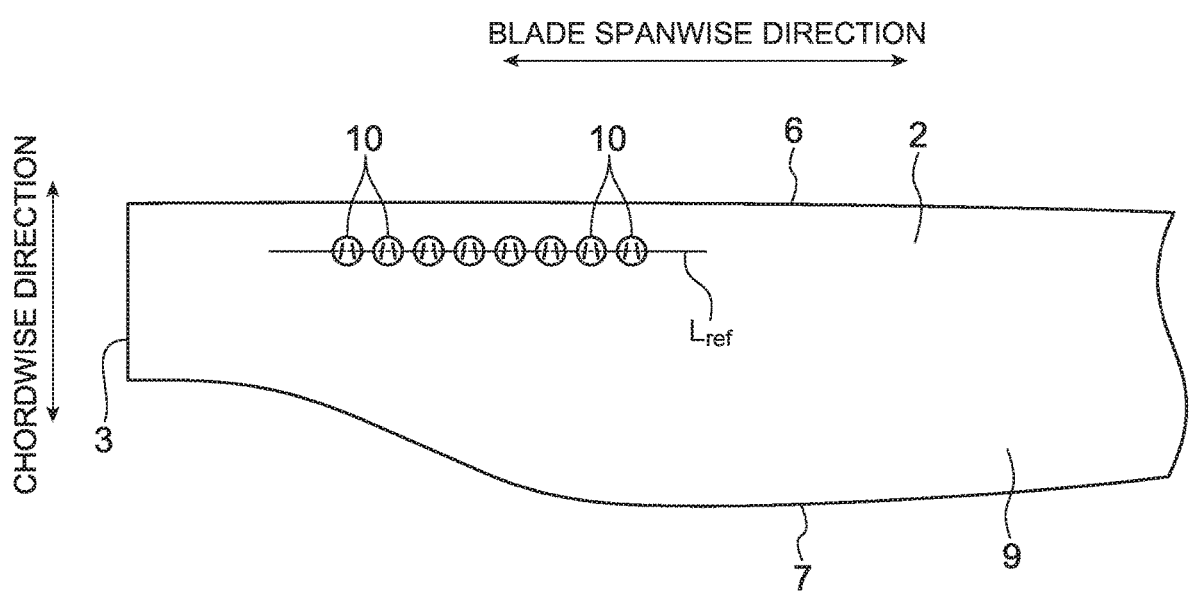
FIG. 12 is a diagram for describing a method of mounting a vortex generator.

Further, as depicted in FIG. 12, a plurality of the vortex generators 10 may be mounted to the wind turbine blade 1 with reference to the single line $L_{ref}$ drawn on the wind turbine blade 1. With the plurality of vortex generators 10 mounted to the wind turbine blade 1 with reference to the single line $L_{ref}$ as described above, it is possible to mount the wind turbine blade 1 efficiently to the vortex generator 10.

As described above, with the vortex generator 10 mounted to the wind turbine blade 1 in such a way that the marks 20 indicating orientation of the vortex generator 10 are disposed on the line $L_{ref}$ connecting the reference points $P_1$ and $P_2$ specified on the wind turbine blade 1, it is possible to mount the vortex generator 10 to the wind turbine blade 1 in a suitable mounting direction with respect to an inflow direction of wind.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A vortex generator for a wind turbine blade, comprising:
    a platform portion to be fixed to a surface of the wind turbine blade; and
    at least one fin erected on the platform portion,
    wherein the platform portion includes marks disposed on a pair of opposite positions in an outer edge region of the platform portion and indicating orientation of the vortex generator, and
    wherein each of the at least one fin includes:
        a leading edge having a first end connected to the platform portion;
        a trailing edge having a second end connected to the platform portion;
        a pressure surface and a suction surface connected to the platform to extend between the leading edge and the trailing edge, and
        a fin root continuously connected to the platform portion between the first end of the leading edge and the second end of the trailing edge,
    wherein the platform portion has a circular shape in a top view,
    wherein the platform portion includes:
        a first surface facing the surface of the wind turbine blade; and
        a second surface which is disposed on an opposite side of the first surface and to which the fin root is connected,
    wherein the marks are formed on the second surface of the platform portion to be disposed on a center line of the circular shape of the platform that passes through a center of the circular shape and the pair of opposite positions.

2. The vortex generator for a wind turbine blade according to claim 1,
    wherein the marks are recessed from a portion, around the marks, of the platform portion.

3. The vortex generator for a wind turbine blade according to claim 1,
    wherein a pressure surface and a suction surface of the fin have a draft in a height direction based on the platform portion.

4. A wind turbine blade comprising:
    a blade body; and
    the vortex generator according to claim 1, mounted to a surface of the blade body.

5. The wind turbine blade according to claim 4,
    wherein the vortex generator is disposed on a suction surface of the blade body and within a turbulence region of a wind flow along the suction surface.

6. A wind turbine power generating apparatus, comprising the wind turbine blade according to claim 4.

7. The wind turbine blade according to claim 4, further comprising an adhesive between the vortex generator and the surface of the blade body.

8. The vortex generator according to claim 1,
    wherein each of the at least one fin includes:
    a fin tip disposed opposite to the fin root,
    wherein the leading edge extends linearly toward the fin tip from the first end that is a connection point of the leading edge with the fin root,
    wherein the trailing edge extends linearly toward the fin tip from the second end that is a connection point of the trailing edge with the fin root.

9. The vortex generator according to claim 1,
    wherein each of the at least one fin has a triangular shape in a side view, the triangular shape being defined by:
        a first edge formed by the leading edge;
        a second edge formed by the trailing edge; and
        a base edge formed by the fin root connected to the platform portion.

10. A vortex generator for a wind turbine blade, comprising:
    a platform portion to be fixed to a surface of the wind turbine blade; and
    at least one fin erected on the platform portion, wherein the platform portion includes marks disposed on a pair of opposite positions in an outer edge region of the platform portion and indicating orientation of the vortex generator, wherein the platform portion has a circular shape in a top view, wherein a line connecting the pair of opposite positions passes through a center of the circular shape of the platform portion, wherein the at least one fin comprises two fins disposed adjacent to each other on the platform portion and oriented so that chordwise directions of the two fins intersect with each other, and wherein the marks comprise:
- a first reference mark disposed on the line which connects the pair of opposite positions and passes through the center of the circular shape of the platform portion, and which is orthogonal to a bisector of an angle formed by the chordwise directions of the two fins; and
- a second reference mark disposed on a second line which connects a second pair of opposite positions and passes through the center of the circular shape of the platform portion, and which is parallel to the bisector of the angle formed by the chordwise directions of the two fins.

11. A vortex generator for a wind turbine blade, comprising:
- a platform portion to be fixed to a surface of the wind turbine blade; and
- at least one fin erected on the platform portion, wherein the platform portion includes marks disposed on a pair of opposite positions in an outer edge region of the platform portion and indicating orientation of the vortex generator, wherein the at least one fin comprises two fins disposed adjacent to each other on the platform portion, and oriented so that chordwise directions of the two fins intersect with each other, and wherein the marks comprise:
- a reference mark formed along a reference line orthogonal to a bisector of an angle formed by the chordwise directions of the two fins; and
- an angle-indicating mark formed along a line forming a predetermined angle with the reference line.

12. The vortex generator for a wind turbine blade according to claim 11, wherein the angle-indicating mark comprises a plurality of angle-indicating marks formed along a plurality of lines forming different angles with the reference line, respectively, and wherein at least one of the angle-indicating marks is different in length or thickness from the reference mark and the other angle-indicating marks.

13. A method of mounting a vortex generator, comprising:
- a step of specifying positions of at least two reference points on a wind turbine blade; and
- a step of mounting the vortex generator according to claim 1 to the wind turbine blade so that the marks of the vortex generator are disposed on a line connecting the reference points.

* * * * *